United States Patent Office 3,349,630
Patented Oct. 31, 1967

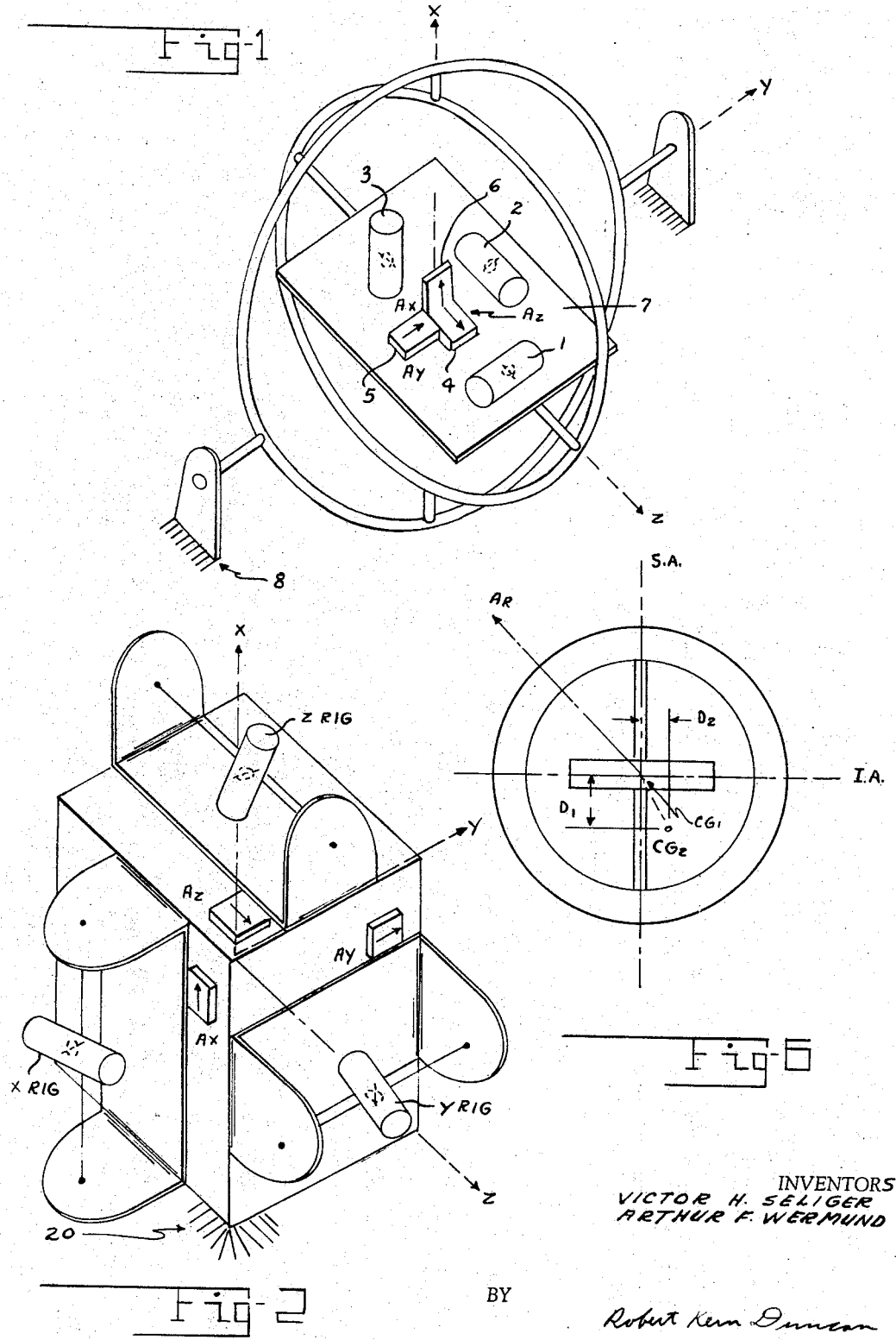

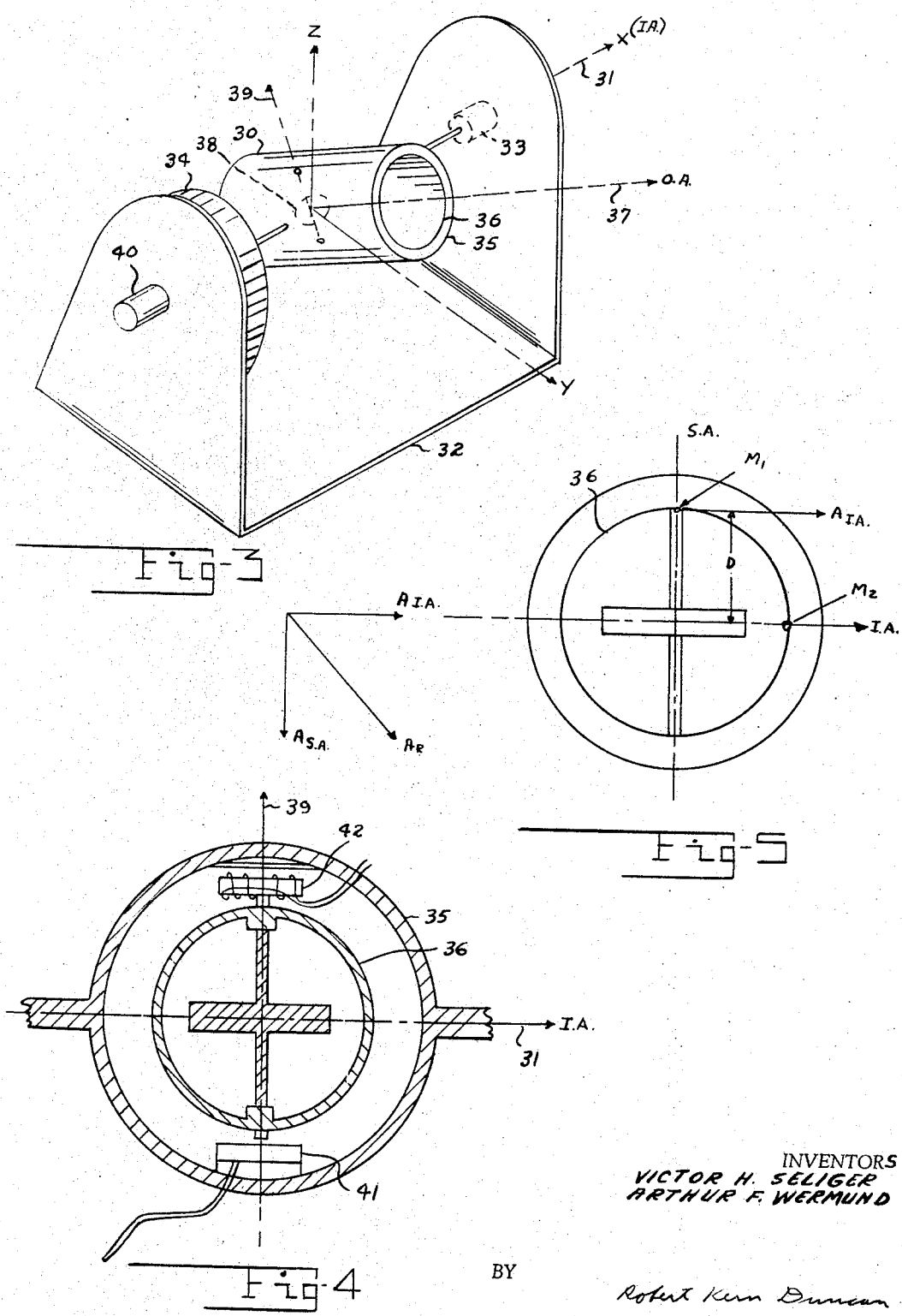

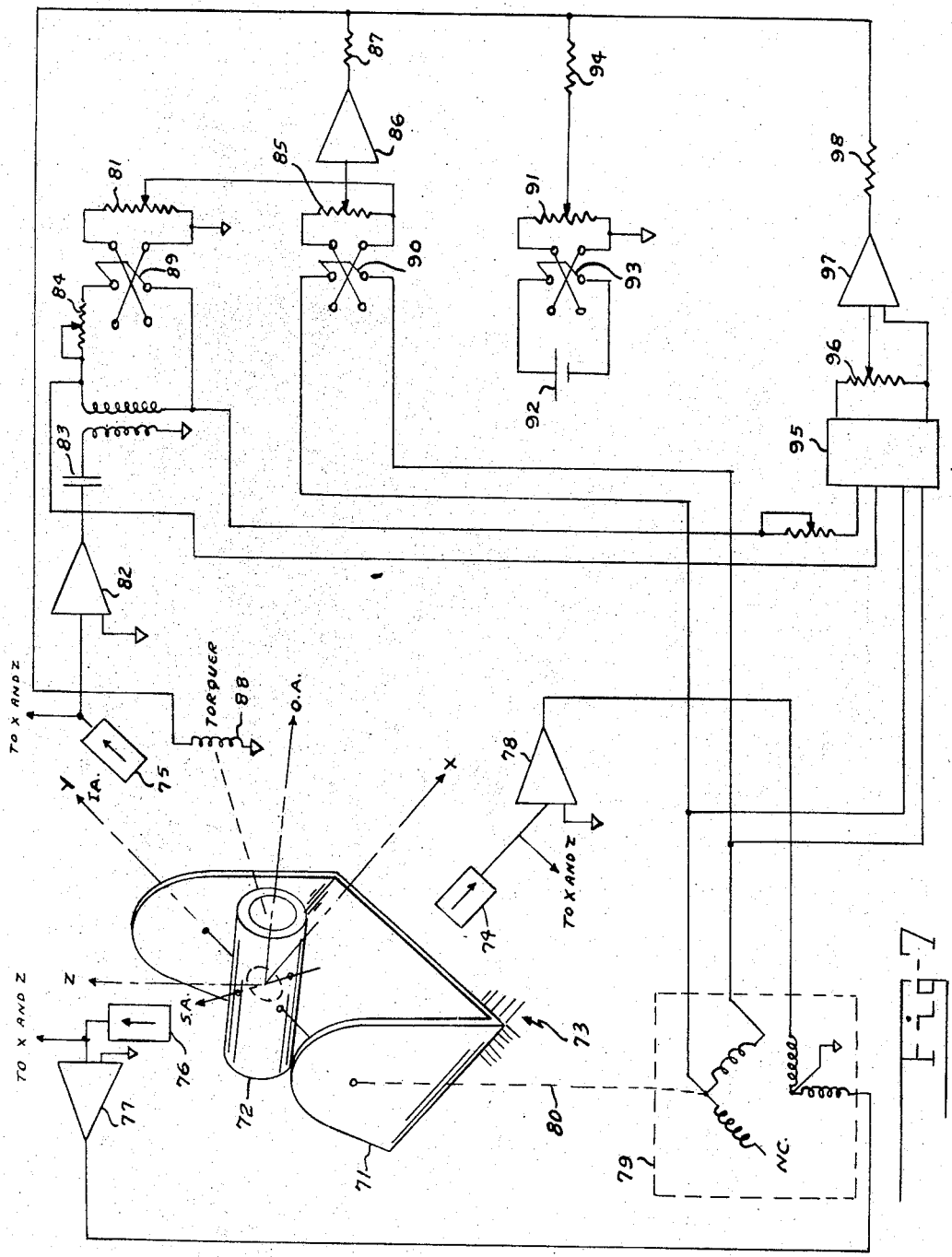

3,349,630
DRIFT COMPENSATION COMPUTER
Victor H. Seliger, North Caldwell, N.J., and Arthur F. Wermund, New York, N.Y., assignors to the United States of America as represented by the Secretary of the Air Force
Filed Sept. 30, 1965, Ser. No. 491,851
2 Claims. (Cl. 74—5.34)

ABSTRACT OF THE DISCLOSURE

An electronic compensating system for use with the rate integral gyroscopes of no-gimbal inertial guidance systems in which signals from $x$, $y$, and $z$ axes accelerometers actuate torquers to generate torquing forces on the gyroscopes that compensate and correct for the anisoelastic drifts caused by acceleration forces on the mass unbalances of the gyroscopes.

---

All inertial guidance systems utilize gyroscopes as sensors to detect motions of a vehicle with respect to inertial space. If these gyros were perfect they would exactly sense the vehicle motion, however, due to certain imperfections in gyro construction, a phenomenon known as drift occurs which results in an error in position indications determined from gyro information. Most of this drift is caused by torques due to acceleration forces acting upon the gyros. To secure optimum inertial system performance it is necessary to compute the magnitude of the drift of each gyro in the system and supply correcting torques to that gyro such that the drift is eliminated. The following will show that the standard method for correcting drift of conventional (stable platform) guidance system does not apply to the rate integral gyros used in the no-gimbal system, and hence a new system was conceived that differs from all previous systems.

It is therefore an object of the present invention to provide a system that will correct rate integral gyroscopes for errors arising from acceleration forces acting upon the gyroscope.

It is another object of the present invention to provide a system that will correct rate integral gyroscopes for errors arising from anisoelastic torque forces.

It is another object of the present invention to provide a drift compensation computing system that will combine the individual correction signal components for drift compensation and provide a resultant correction signal to the torquer element of rate integral gyroscopes.

Various other objects and advantages will appear from the following description of one embodiment of the invention in which:

FIG. 1 is a schematic representation of the prior art, stable platform gyroscope system;

FIG. 2 is a schematic representation of a no-gimbal gyroscope system;

FIG. 3 is a schematic representation of a rate integral gyro;

FIG. 4 is a schematic representation of a cross section of the computing head of a rate integral gyro;

FIG. 5 is a schematic representation of the mass unbalance torques acting within the computing head;

FIG. 6 is a schematic representation of the anisoelastic torque acting within the computing head; and FIG. 7 is a schematic representation of the drift compensation computer for one axis.

Both the no-gimbal system and the stable platform system are used to determine vehicle rotations in inertial space. The fundamental differences between a stable platform system and the no-gimbal system are illustrated in FIG. 1 and FIG. 2, FIG. 1 depicting the stable platform system and FIG. 2 the no-gimbal system. The stable platform system shown schematically in FIG. 1 comprises three gyros 1, 2 and 3 and three accelerometers 4, 5 and 6 mounted rigidly with respect to each other on a platform 7; the platform has three degrees of freedom, because of its gimbal system, and therefore can remain stationary in inertial space by assuming any orientation with respect to the vehicle frame 8. In this case the magnitude of acceleration along each critical gyro axis is always explicitly determined by one of the accelerometers ($A_x$, $A_y$, $A_z$).

In the no-gimbal system shown in FIG. 2 the yoke of each RIG (Rate Integral Gyro) and the 3 accelerometers are mounted rigidly to the aircraft or other vehicle frame 20. Since the gyros may rotate with respect to their yokes, the acceleration along each gyro axis is no longer determined by an individual accelerometer, thus making drift compensation of this system much more complex.

The following describes the operation of the rate integral gyro and the mechanics of the drift problem in order that the drift computer system herein disclosed may be better understood.

A simplified schematic diagram of an $x$ axis RIG is shown in FIGS. 3 and 4. As shown the RIG comprises a computing head 30 that is free to rotate about an axis 31, called the Input Axis (I.A.) in bearings mounted in the yoke 32. Torque may be applied about the I.A. by the torque motor 33 and the amount of rotation of the computing head with respect to the yoke is determined by the code wheel 34. The computing head consists of 2 concentric cylinders 35 and 36, having a center of rotation about the Output Axis (O.A.) 37. The inner cylinder 36, which is conventionally floated in oil, contains the bearing for the gyro wheel 38, which has a spin axis 39. As indicated in FIG. 4, a pickoff 41 is mounted between the inner and outer cylinders such that an electrical output is obtained that is proportional to the angular displacement between the cylinders, and there is a torquer 42 which exerts a correction torque on the inner cylinder proportional to current supplied to it. In operation any displacement of the inner cylinder will cause an output voltage from the pickoff; this output is amplified and used to energize the torque motor. The motor then applies a torque to the computing head, and hence the gyro wheel, which tends to reduce the displacement. This motor torque will, in general, cause a rotation of the computing head and this rotation is picked up by the code wheel as a system output. Resolver 40 supplies an electrical output that is the resultant of the angular position of the computing head and an electrical input signal.

To understand the gyro drift phenomenon, consider FIGS. 5 and 6. In FIG. 5 mass unbalances ($M_1$ and $M_2$) are considered to be located along the S.A. and the I.A. Although the masses are shown in localized positions, each located at a distance D, it is to be understood that in most instances they will be distributed. If an acceleration $A_R$ exists, it can be resolved into a component parallel to the I.A. ($A_{I.A.}$) and a component parallel to the S.A. ($A_{S.A.}$). It may be seen that these two components of acceleration will cause a net torque on the inner cylinder of:

Unbalance Torque = $T_U = T_{I.A.} + T_{S.A.}$ where $T_{I.A.}$ is the torque vector along the input axis and $T_{S.A.}$ is the torque vector along the spin axis
$= A_{S.A.}(M_2)(D) + A_{I.A.}(M_1)(D)$
$= A_{S.A.}K_1 + A_{I.A.}K_2$ where $K_1$ and $K_2$ are constants of the respective products of the individual mass unbalances and their lever arms The anisoelastic effect is illustrated in FIG. 6 where it is seen that with zero acceleration, the center of gravity of the gyro wheel lies at the geometric center of the inner cylinder ($CG_1$), however, because of the anisoelastic properties or the gyro shaft and bearings, the acceleration $A_R$ causes the center of gravity to shift to a new position represented as $CG_2$. The acceleration acting on the center of gravity at the new position also causes a torque on the inner cylinder. Again resolving $A_R$ into components $A_{I.A.}$ and $A_{S.A.}$, and expressing the location of $CG_2$ in terms of $D_1$ and $D_2$;

$D_1 = A_{S.A.}M/K_{S.A.}$ where
$M$ = Mass of Gyro Wheel
$K_{S.A.}$ = Spring constant along S.A. and
$D_2 = A_{I.A.}M/K_{I.A.}$ (where $K_{I.A.}$ is the spring constant along I.A.)

The foregoing expressions locate the new effective center of gravity resulting from the acceleration force acting on the anisoelastic suspension of the gyro wheel.

The net torque on the inner cylinder due to anisoelastic effect can be expressed as:

$$\begin{aligned}\text{Anisoelastic Torque} = T_A &= A_{S.A.}MD_2 - A_{I.A.}MD_1 \\ &= A_{S.A.}M(A_{I.A.}M/K_{I.A.}) \\ &\quad - A_{I.A.}M(A_{S.A.}M/K_{S.A.}) \\ &= A_{S.A.}A_{I.A.}(M^2/K_{I.A.} - M^2/K_{S.A.}) \\ &= A_{S.A.}A_{I.A.}(K_4)\end{aligned}$$

(where constant $K_4$ replaces the previous constants of mass and elasticity)

The anisoelastic and unbalance torques applied to the inner cylinder will cause an output from the RIG code wheel, however, an output is only desired when the vehicle rotates; therefore, it is desired to compensate these torques and this invention discloses a system that will compute the instantaneous values of $T_U$ and $T_A$ and energize the torquers of rate integral gyros with the proper current to counterbalance them.

FIG. 7 is a block-schematic drawing of the system for drift compensation of the Y axis rate integral gyro in a no-gimbal system. For brevity only the Y RIG is shown. It is to be understood that similar systems will be used with each rate integral gyro contained in the no-gimbal inertial system. The accelerometers, however, need not be duplicated for the X RIG and the Z RIG.

The yoke 71 of the Y RIG 72 is rigidly mounted with respect to the vehicle body 73, thus the $x$, $y$ and $z$ axes of this RIG are also fixed with respect to the frame. (Likewise these same axes apply and are fixed for the X RIG and Z RIG.) Accelerometers 74, 75 and 76 are mounted, fixed to the frame, along the $x$, $y$ and $z$ directions, respectively.

As shown in FIG. 5 and FIG. 6 mass unbalances will exist, on the inner cylinder, that can be considered to lie along the spin axis (S.A.) and along the input axis (I.A.). The component of acceleration that is parallel to the spin axis ($A_{S.A.}$), acting upon the mass unbalance along the input axis will cause a torque ($T_{I.A.}$) about the output axis, the component of acceleration that is parallel to the I.A., acting upon the mass unbalance along the S.A. will also cause a torque ($T_{S.A.}$) about the O.A. There will in addition be a constant torque ($T_{D.C.}$) about the O.A. due to stray fields and lead tensions. Finally, the combined application of accelerations along the S.A. and along the I.A. will cause a torque ($T_A$) about O.A. due to the anisoelastic properties of the wheel shaft and bearings.

It may be seen, therefore, that the accelerations which are of concern in all of these drift producing torques are $A_{S.A.}$ and $A_{I.A.}$. $A_{I.A.}$ is measured directly by the accelerometer 75 along the $y$ axis. The accelerations $A_Z$ and $A_X$ are supplied by accelerometers 76 and 74 through line amplifiers 77 and 78, respectively, as inputs to the resolver 79, which is positioned by the computing head shaft (as indicated by dotted line 80). The output of the resolver 79 is therefore $A_{S.A.}$.

To compute $T_{S.A.}$, $A_Y$ must be multiplied by the resultant mass unbalance ($K_1$) along the S.A. This is accomplished by manually setting an electrical value equivalent to $K_1$ on potentiometer 81, while energising the potentiometer with an A.C. voltage proportional to $A_Y$. To do this a line amplifier 82 is required for isolation and capacitor 83 and variable resistance 84 are desirable for trimming. Similarly, the output of the resolver 79, which is an A.C. voltage proportional to $A_{S.A.}$ is used to energize potentiometer 85 and this potentiometer is manually set to a value equivalent to $K_2$, a magnitude proportional to the mass unbalance along the I.A. The output of potentiometer 85 without the addition of $T_{S.A.}$ is thus a voltage proportional to $T_{I.A.}$. The two voltages proportional to $T_{I.A.}$ and $T_{S.A.}$ are series added by placing potentiometer 85 at the potential $T_{S.A.}$, and the sum is the input to the demodulator 86. The D.C. output from demodulator 86 is supplied through summing resistance 87 as one of the compensating inputs to the gyro torquer 88. The gyro torquer supplies a torque about O.A., the output axis, proportional to the current supplied to it. Switches 89 and 90 are to provide for both positive and negative unbalance. (Negative in the sense of opposite direction.) It is frequently desirable to connect the voltages representing $A_X$ and $A_Z$ to isolated resolver windings to permit correct acceleration polarity.

The correction for D.C. unbalance ($T_{D.C.}$) is obtained by energizing potentiometer 91 with a well regulated D.C. voltage, represented by battery 92, again with a reversing switch 93 for polarity reversal, and manually setting a value on the potentiometer 91 equivalent to $K_3$. The D.C. voltage proportional to $T_{D.C.}$, is then added as a component to the torquer correction voltage through summing resistance 94.

It is generally considered that approximately 80% of the drift caused by the anisoelastic effect is due to mass displacements along the spin axis caused by a force along the spin axis and mass displacements along the input axis caused by force along the I.A. or $D_{S.A.}$ = Displacement $S.A. = F_{S.A.}/K_{S.A.} = A_{S.A.}M/K_{S.A.}$
$= D_1$ where
$M$ = mass of gyro wheel and
$K_{S.A.}$ = spring constant along the spin axis (this is the $D_1$ previously referred to and shown in FIG. 6) and
$D_{I.A.}$ = Displacement $I.A. = F_{I.A.}/K_{I.A.} = A_{I.A.}M/K_{I.A.}$
$= D_2$ where
$K_{I.A.}$ = spring constant along the input axis (this is the $D_2$ previously referred to and shown in FIG. 6)

Since $A_{I.A.}$ in FIG. 7 for the Y RIG is measured by $A_y$, the expression for $D_{I.A.}$ becomes: $D_{I.A.} = A_y M/K_{I.A.}$.

Therefore, the total torque due to anisoelasticity may be expressed as: $T_A = -A_y M D_{S.A.} + T_{S.A.} M D_{I.A.}$ or $$T_A = -A_y M(A_{S.A.}M/K_{S.A.}) + A_{S.A.}M(A_y M/K_{I.A.})$$

$$= A_y A_{S.A.} M^2 \left(\frac{1}{-K_{S.A.}} + \frac{1}{K_{I.A.}}\right) = A_y A_{S.A.} K_4$$

where $K_4$ is a new constant replacing the constants of mass and elasticity. In observing the illustration shown in FIG. 6 it is readily seen that the anisoelastic torques caused by acceleration along the S.A. and the I.A. will be of opposite polarity, hence the minus sign in the foregoing equation. It is to be noted that the polarities may be referred to the constants in the equation and combined in single new constant $K_4$.

This equation is mechanized as shown in FIG. 7. The A.C. voltages proportional to $A_{S.A.}$ and $A_y$ are multiplied electronically in the operational amplifier 95, the output of which energizes potentiometer 96 which is manually positioned to a value equivalent to $K_4$. The output taken from the potentiometer 96 is demodulated in demodulator 97 and is added through summing resistance 98 as a correction component to the voltage applied to the torquer 88. The $T_A$ voltage and the $K_4$ setting do not need to be known explicitly. All other corrective torque voltages are set first, then the RIG is placed such that the S.A. and the I.A. are each at a 45° angle with respect to the local vertical and then potentiometer 96 is adjusted until the change in torquer current is zero. Again, it may be desirable that neither of the input lines to the demodulator 97 be at ground potential so that the arm of potentiometer can swing either plus or minus about the ground potential, as it is shown, or alternatively if it is desired to ground one side of the input to the demodulator a reversing switch may be employed to effect polarity reversals. The particular torquer employed may be single-ended as shown and may be mechanically or electrically biased or a push-pull center tapped torquer may be employed.

In operation it has been found desirable to reset all potentiometers for each flight due to the day-to-day variation in the unbalance parameters of the gyros. A procedure has been devised whereby these parameters may be determined experimentally, just prior to making the flight with the aid of additional equipment and by making use of the D.C. output of a stabilizing amplifier. The equipment required consists of an accurately positioned tilt turntable, an additional current source, and a precision potentiometer. The tilt turntable is used to locate each gyro accurately with respect to the earth coordinate system. The current source supplies sufficient current to overcome the component of earth rate seen by the gyro. The precision potentiometer is required to accurately measure torquer current. With each gyro accurately positioned in three predetermined positions, the three unknown constants of each gyro can be determined. In this mode of operation, the torquer is disconnected from the normal compensation circuitry, the normal RIG servo is disconnected, and a D.C. output proportional to pickoff displacement is obtained from the demodulator; this is used to energize the torquer (through a stabilization network) to form a torquer servo. This servo has a low current capability and, hence, at positions of high earth rate, an additional current source is required to null the servo. When the servo is nulled at the known position the torquer current may be accurately measured. Knowing the earth rate at three positions and the torquer calibration, it is possible to determine the three parameters for the gyro. These parameters remain constant once determined for a given flight. After all potentiometers are set at the proper values, the stabilization amplifier output is disconnected from the torquer and normal RIG servo and torquer compensation connections are resumed.

Although a particular embodiment of this invention has been described, it is not to be construed in a limiting sense. Many variations and modifications of the invention will be made by those skilled in the art without departing from the true scope and spirit of the invention as defined in the appended claims.

We claim:

1. In a rate integral gyro having an input axis with a resolver coupled thereto, a spin axis, and an output axis with a torquer for applying torque to the gyro wheel about the said output axis; the said gyro having undetermined mass unbalances along the said input axis and the said spin axis and undetermined factors of elasticity of the gyro wheel suspension, the said gyro being located in space represented by the three conventional $x$, $y$, and $z$ coordinate axes with the said input axis parallel to one of the said three coordinate axes, said coordinate axis parallel to said input axis being designated the first coordinate axis, the system for compensating drifts in the said gyro caused by acceleration forces acting on the said mass unbalances of the said gyro; said system comprising: means for sensing the acceleration in each of the $x$, $y$ and $z$ coordinate axes; means cooperating with the said acceleration sensing means in the said first coordinate axis providing a first output signal proportional to the product of the acceleration along the said input axis and the said mass unbalance along the said spin axis; means cooperating with the means sensing the acceleration parallel to the second and third coordinate axes and the said resolver providing a second output signal proportional to the product of the said mass unbalance along the input axis and the acceleration along the spin axis; means cooperating with the said resolver and the said acceleration sensing means in the said first coordinate axis providing a third output signal proportional to the product of the acceleration along the input axis, the acceleration along the spin axis, the square of the mass of the gyro wheel, and the said elasticity factors of the gyro wheel suspension; and means cooperating with the said first, second, and third output signals and the said gyro torquer for applying torque about said output axis to compensate for the effects of said acceleration forces acting on the said mass unbalance.

2. In a no-gimbal inertial guidance system having three similar vehicle-mounted, rate integral gyros, the first having its input axis parallel to the $x$ axis of the said vehicle, the second having its input axis parallel to the $y$ axis of the said vehicle, and the third having the input axis parallel to the $z$ axis of the said vehicle, each of the said gyros rotatably mounted about their said input axes and having resolvers coupled to each of the said gyros responsive to the gyro position about the input axis; each gyro having a spin axis, an output axis, and a torquer for rotation of the gyro spin axis about its output axis; the said guidance system having accelerometers providing signals proportional to the said vehicle acceleration in each of the said $x$, $y$ and $z$ axes; the improvement in said inertial guidance system for compensating drifts in the said rate integral gyros resulting from torques produced by acceleration forces acting on the undetermined mass unbalances of said gyros and for compensating the drifts resulting from torques resulting from the undetermined anisoelastic properties of the gyro wheel suspensions of the said gyros, said improvement comprising: in each of the said three gyros; means cooperating with the accelerometer parallel to the input axis of the gyro providing a first output signal proportional to the torque resulting from the acceleration force parallel to the said gyro input axis; means cooperating with the accelerometers in the other axes, and the said resolver providing a second output signal proportional to the torque resulting from the acceleration force parallel to the said spin axis of the gyro; means cooperating with the three said accelerometers, and the said resolver providing a third output signal proportional to the torque resulting from acceleration force and the said anisoelastic properties; and summing means responsive to said first, second and third output signals, cooperating with the said gyro torquer for applying torque about the output axis whereby the said drifts in each rate integral gyro are compensated.

References Cited

UNITED STATES PATENTS

| | | | |
|---|---|---|---|
| 2,985,023 | 5/1961 | Weiss et al. | 74—5.34 |
| 3,127,774 | 4/1964 | Fischer et al. | 74—5.34 X |
| 3,129,593 | 4/1964 | Bolton | 74—5 |
| 3,164,340 | 1/1965 | Slater et al. | 74—5.34 X |
| 3,258,977 | 7/1966 | Hoffman | 74—5 X |

FRED C. MATTERN, JR., *Primary Examiner.*

C. J. HUSAR, *Examiner.*